(12) United States Patent
Matsumoto

(10) Patent No.: US 7,030,327 B2
(45) Date of Patent: Apr. 18, 2006

(54) ACCELERATION DETECTOR

(75) Inventor: Tohru Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/947,372

(22) Filed: Sep. 23, 2004

(65) Prior Publication Data
US 2005/0077158 A1 Apr. 14, 2005

(30) Foreign Application Priority Data
Oct. 8, 2003 (JP) .............................. 2003-349887

(51) Int. Cl.
*H01H 35/14* (2006.01)

(52) U.S. Cl. ................................. 200/61.45 R; 29/622
(58) Field of Classification Search ............. 73/514.01, 73/514.16, 514.29, 514.35; 200/61.45 R, 200/61.48, 61.49, 61.51, 61.52, 61.53; 29/622
See application file for complete search history.

(56) References Cited

U.S. PATENT DOCUMENTS

| 5,192,838 | A | * | 3/1993 | Breed et al. ........... 200/61.45 R |
| 5,793,006 | A | * | 8/1998 | Asada ..................... 200/61.53 |
| 5,801,348 | A | | 9/1998 | Asada |
| 6,455,791 | B1 | * | 9/2002 | Yamashita et al. ....... 200/61.53 |
| 6,610,940 | B1 | * | 8/2003 | Flaig et al. ........... 200/61.45 R |
| 6,647,788 | B1 | * | 11/2003 | Murai et al. ............. 73/514.01 |
| 6,720,505 | B1 | | 4/2004 | Matsumoto et al. |

FOREIGN PATENT DOCUMENTS

| JP | 9-211023 A | 8/1997 |
| JP | 11-174077 A | 7/1999 |
| JP | 11-295334 A | 10/1999 |
| JP | 2001-50975 A | 2/2001 |

* cited by examiner

*Primary Examiner*—Michael A. Friedhofer
(74) *Attorney, Agent, or Firm*—Sughrue Mion, PLLC

(57) ABSTRACT

An acceleration detector includes a mass body movably housed in a case, an elastic member backwardly urging the mass body, and a switch that opens and closes by forward movement of the mass body against urging force, when acceleration is received by the mass body, wherein the mass body is formed of synthetic resins, whose specific gravity is high, molded by an injection molding process, and wherein metal powder having corrosion resistance and a material having sliding characteristic are added to the synthetic resins.

10 Claims, 4 Drawing Sheets

ACCELERATION DETECTOR

BACKGROUND OF THE INVENTION

1. Field of the Invention

The present invention relates to a device able to detect acceleration through a switching operation of a switch caused by movement of a mass body due to an action of acceleration. More particularly, the invention relates to an acceleration detector for detecting a collision of a mobile unit such as a vehicle and for actuating its airbag.

2. Description of the Related Art

Generally, an acceleration detector of this kind includes a mass body that is housed movably back and forth in a case; a coil spring backwardly urging the mass body; a stationary contact provided in the case; and a moving contact provided in the mass body. The acceleration detector is arranged such that when the vehicle collides against something, the mass body forwardly moves against urging force of the coil spring, and the moving contact contacts the stationary contact to energize a circuit, thereby detecting acceleration larger than a given value.

The set sensitivity (threshold of the detected acceleration) of the acceleration detector is determined by a mass of the mass body, a spring constant and an initial load of the coil spring, and the distance between the moving contact and the stationary contact under unloaded condition.

JP 9-211023 A discloses an acceleration detector in which a mass body is slidably pierced via a through hole by a sliding shaft provided in the longitudinal direction in a case, and is backwardly urged by a coil spring wound around the sliding shaft. The patent publication further says that this conventional mass body is composed of a main-mass member and a sub-mass member each having a through hole formed therein.

The sub-mass member is provided with a truncated cone-shaped spring-holding cylinder that projects forwardly from the fringe of a central hole of a thick disk, and with a plurality of collision buffers on the front of the thick disk. The small cylinder of a front end of the main-mass member is fitted into an inner surface of the spring-holding cylinder, and the diameter of the front end of the small cylinder, projecting from the forward end of the spring-holding cylinder, is outwardly expanded to caulk the sub-mass member to the main-mass member.

Meanwhile, a plurality of contact segments of the moving contact are extended from the periphery of a thin disk, a central hole of the thin disk is engaged with the small cylinder of the main-mass member, and the thick disk is pressed against the main-mass member by the sub-mass member, which holds and fixes the thin disk between the main-mass member and the sub-mass member.

The main-mass member is usually manufactured by a zinc-die casting method or cold-forging processing of copper or brass. One example of the manufacturing processes of the zinc-die casting method is as follows. Die casting→annealing→barrel polishing→deburring→shot blasting→copper underplating→nickel plating→inner-surface burnishing for a through hole. In this way, the zinc-die casting method is usually complicated and entails a lot of processes.

JP 2001-050975 A, which says a relevant art, discloses an optical fiber acceleration sensor including a diaphragm equipped with an optical fiber coil in such a manner that the coil-expands and contracts in opposite directions each other; an acceleration detecting portion composed of a supporting base supporting the diaphragm and a weight secured on the diaphragm; and an optical component composed of an optical coupler and FRM that are connected with the optical fiber coil and output interference light by forcing light to be interfered with one another, which is input to the optical fiber coil and propagated through the same, wherein a potting resin is filled in a space of the sensor to secure the optical component.

Further, JP 11-174077 A discloses an acceleration detector including a diaphragm at the center of which a weight is provided; a base supporting the periphery of the diaphragm; and an acceleration sensor that is secured on a surface opposing the surface on which the weight of the diaphragm is provided and outputs an acceleration signal according to what extent the diaphragm is deformed, which is resulted from acceleration impressed on the weight, wherein the diaphragm is formed of plastic resin material.

Moreover, JP 11-295334 A discloses an acceleration sensor including a lead switch having an output terminal that turns on by a change of a magnetic field, and outputs a rapid deceleration detecting signal of minute electric current; a cylindrical inner housing that houses therein the lead switch; a magnet mass that is provided movably in an axial direction around the periphery of the inner housing, and inertially moves at the time of rapid deceleration to cause a magnetic field to be changed; a spring that is installed around the periphery of the inner housing and urges the magnetic mass in the direction opposite to inertial movement to control the inertial movement; an outer housing that houses therein the inner housing and the magnetic mass; and an amplifier circuit amplifying the rapid deceleration detecting signal.

In an airbag system in recent years, although at the first stage of collision, a vehicle receives small impact acceleration, it has been necessary to judge whether a collision is occurred or not at the early stage and deploy an airbag, even in a collision typified by an offset collision where high impact acceleration is generated after a fixed time has elapsed. For that purpose, the mass body, on which acceleration is impressed, should sensitively and stably slide forward along a sliding shaft against urging force of the coil spring.

However, because the main-mass member which constitutes the conventional mass body is dominated by a zinc-die casting product or a cold-forging processed product of copper or brass, slidableness of the member is deteriorated due to formation of rust-under high temperature and humidity conditions. Accordingly, there is a possibility that the required response characteristic could not be secured to collision acceleration from diagonal directions generated at the time of an offset collision. For this reason, it calls for surface treatment thereof for the purpose of improving corrosion resistance and sliding characteristic thereof. However, this treatment brings about a drawback in productivity and a cost. Particularly, surface treatment to the zinc-die casting product is extremely complicated and difficult.

Further, the number of components of an airbag system tends to increase for its expanding functionality. Therefore, a space in the substrate on which the acceleration detector is mounted is becoming relatively smaller, and there remains need for further size reduction of the mass body.

In addition, actuation timing of an airbag varies from vehicle to vehicle depending on when to be deployed it, which requires to make the sensitivity of the mass body adjustable according to a type of a vehicle.

SUMMARY OF THE INVENTION

The present invention has been made to solve the above-mentioned problems, and an object of the present invention is to provide an acceleration detector that has a downsized mass body, steadied sensitivity, improved producibility, and a reduced cost.

The acceleration detector according to the present invention includes a mass body movably housed in a case; an elastic member urging the mass body in one direction; and a switch that opens and closes when the mass body moves in another direction against urging force due to acceleration received by the mass body, wherein the mass body is formed of synthetic resins, whose specific gravity is adjustable, molded by an injection molding process.

According to the present invention, since the mass body is formed of synthetic resins, whose specific gravity is adjustable, molded by an injection molding process, the mass body obtains increased freedom of molding the mass body into an arbitrary shape. Therefore, the mass body is at liberty to mold into an arbitrary shape such as make a portion of the mass body smaller than the other portion thereof to adopt the mass body for connecting with another component, as well as to deform a portion of the mass body by grace of plasticity of the synthetic resins in the subsequent process. Accordingly, no member for connecting the mass body with another component is separately provided and hence the mass body can be downsized by simplifying its structure. Moreover, the mass body is formed of synthetic resins and thus the mass body is superior in corrosion resistance to metals. Accordingly, the mass body has steadied sensitivity, and does without surface treatment to improve its corrosion resistance, thereby increasing its producitivity and reducing a cost

DETAILED DESCRIPTION OF THE PREFERRED EMBODIMENTS

First Embodiment

Figure 1:
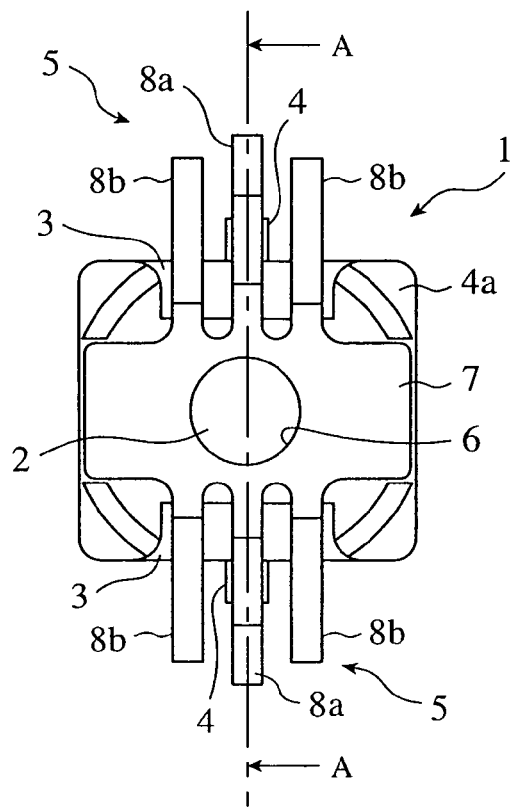
FIG. 1 is a front view showing a mass body seen from the front that constitutes an acceleration detector according to the present invention.
Figure 2:
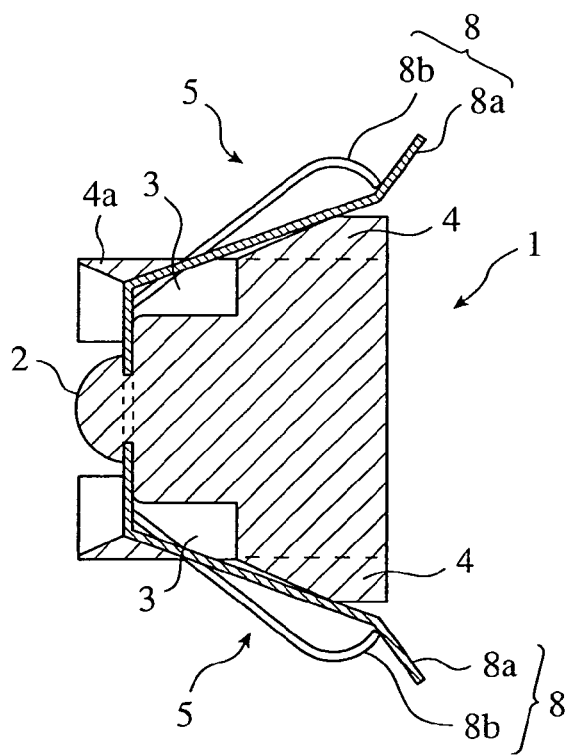
FIG. 2 is a sectional view taken along the line A—A of FIG. 1.
Figure 3:
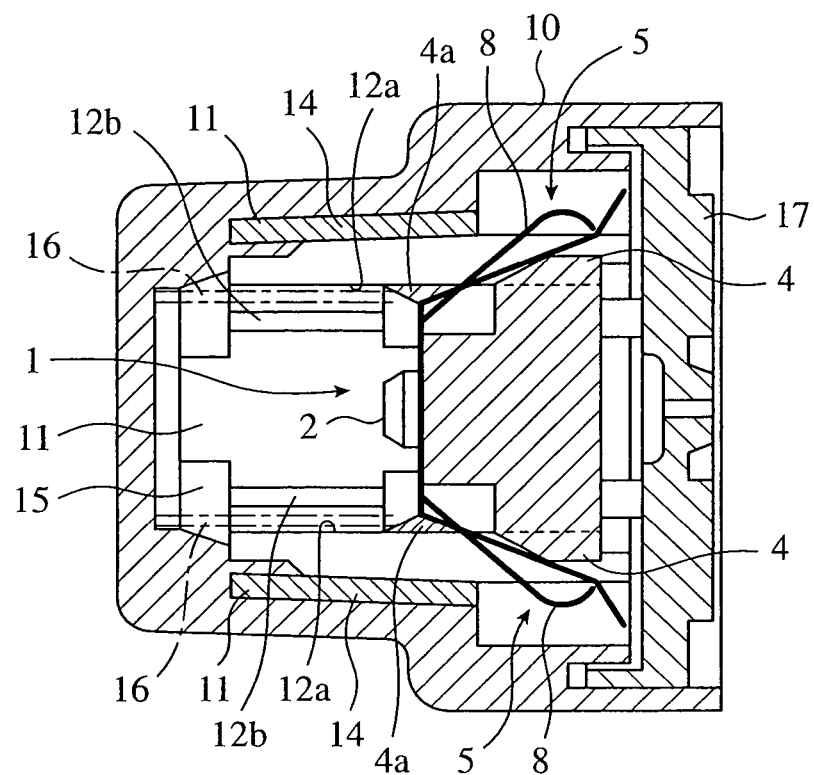
FIG. 3 is a longitudinal sectional view of the acceleration detector according to the present invention, showing a state in which the mass body is housed in a case;.
Figure 4:
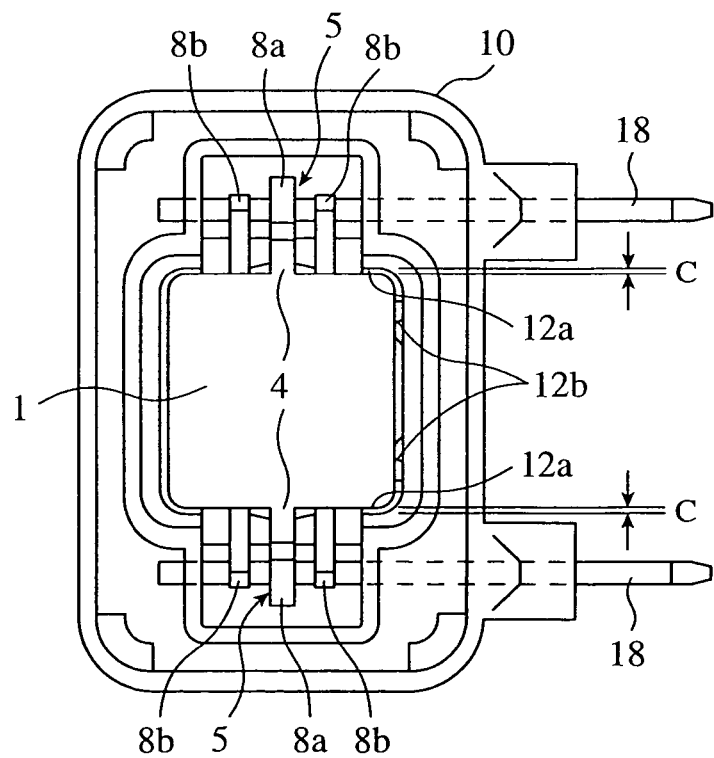
FIG. 4 is a rear view of the detector where a cap is detached as seen from the back in FIG. 3.
Figure 5:
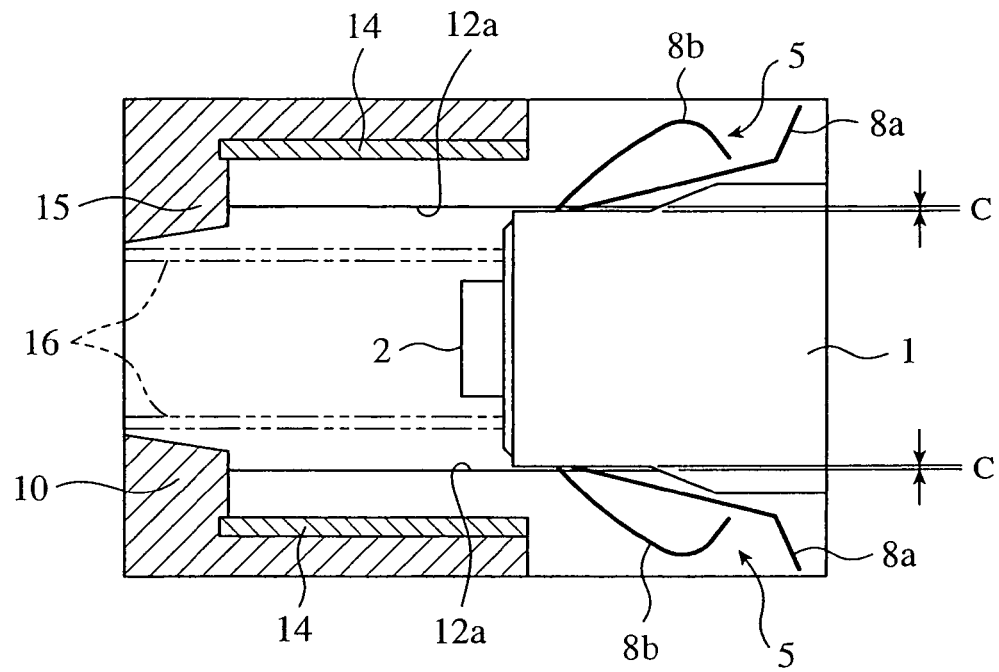
FIG. 5 is a diagram explaining an operation of the acceleration detector according to the present invention.
Figure 7:
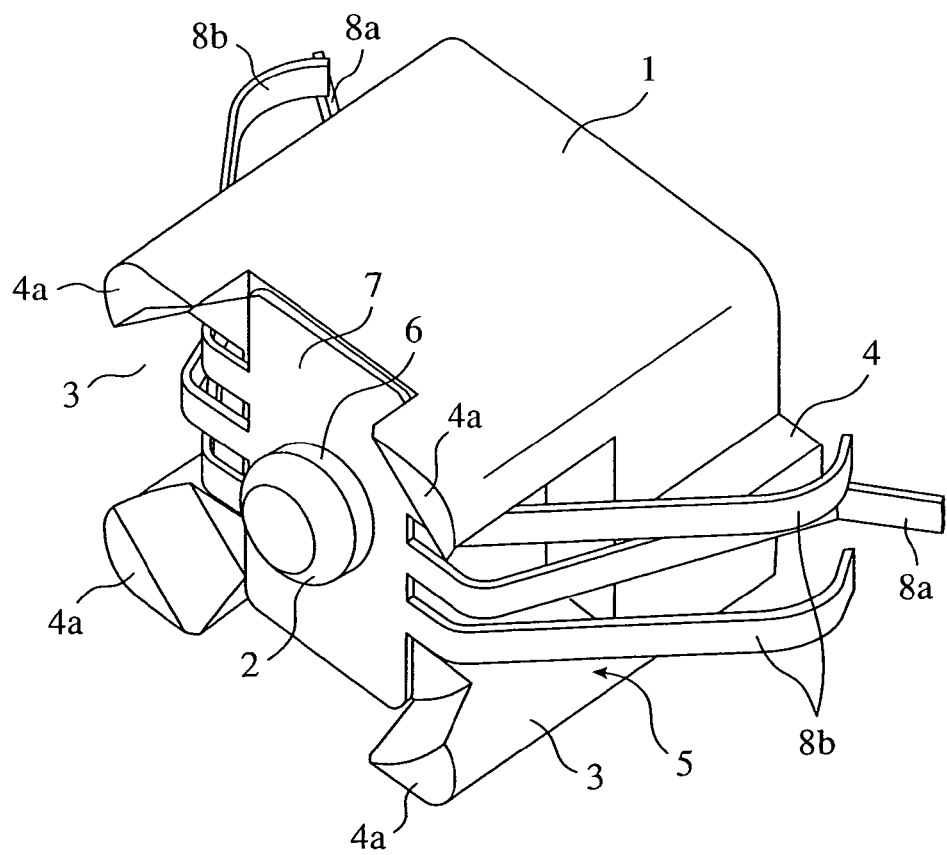
FIG. 7 is a perspective view showing the mass body with which a moving contact is fitted up.
Figure 6:
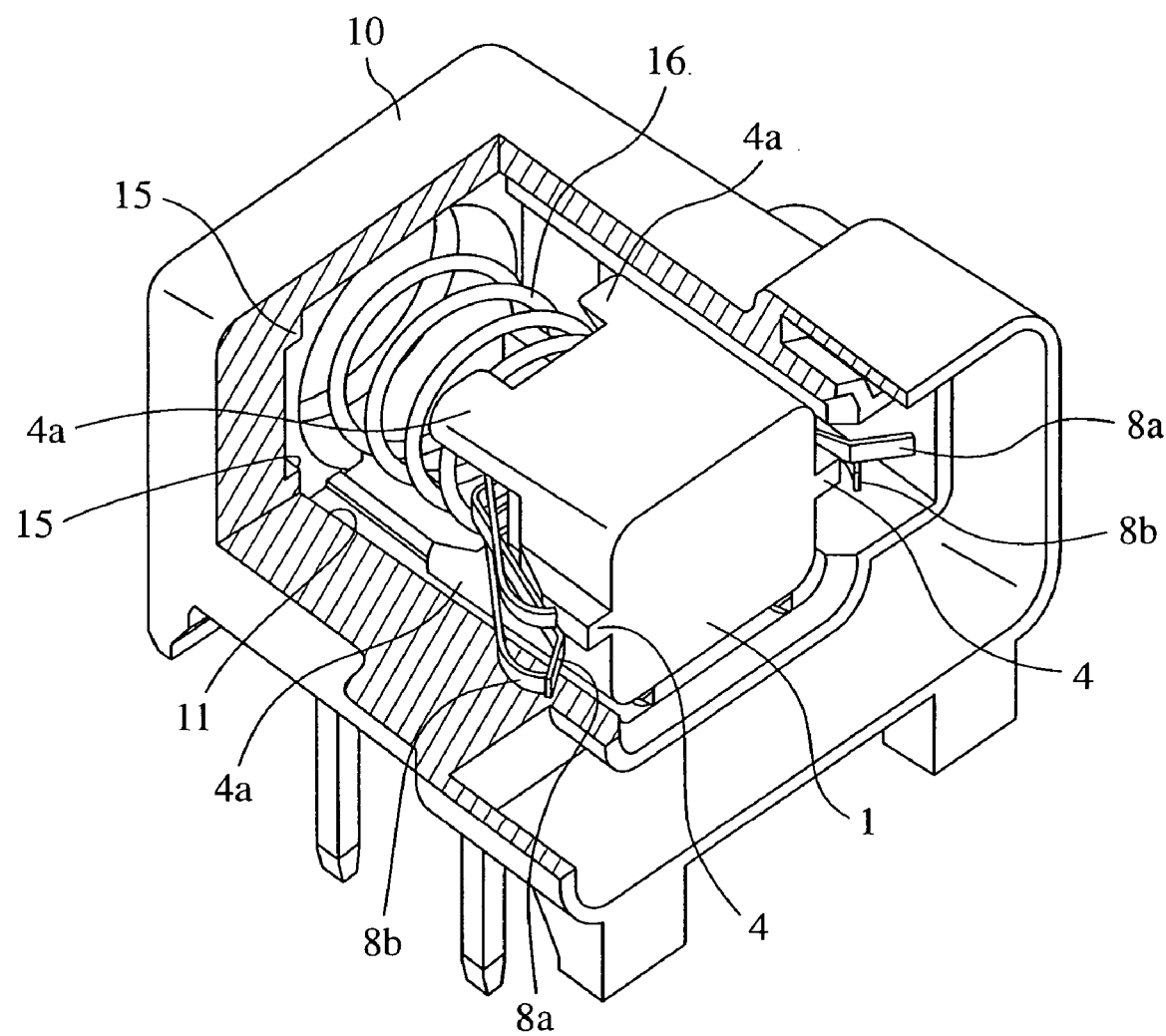
FIG. 6 is a perspective view showing the mass body and a moving contact with a part of the case partially cut out.

FIG. 1 is a front view showing a mass body 1 seen from the front that constitutes an acceleration detector according to the present invention. FIG. 2 is a sectional view taken along the line A—A of FIG. 1. FIG. 3 is a longitudinal sectional view showing a state in which the mass body 1 is housed in a case 10. FIG. 4 is a rear view showing the detector where a cap is detached as seen from the back in FIG. 3. FIG. 5 is a diagram explaining an operation thereof. FIG. 6 is a perspective view showing the mass body 1 and a moving contact 5 with a part of the case 10 partially cut out. FIG. 7 is a perspective view showing the mass body 1 with which the moving contact is fitted up.

Particular limitations are not put as to what shape of the mass body 1 should be taken. However, in FIGS. 1–7, the body is formed substantially in a rectangular shape. At the center in the front of the mass body 1, a boss 2 for attaching the moving contact (described later) is provided. On the upper and lower or the right and left sides of the mass body 1, concaves 3 opened in front are formed, and additionally, in the center of the sides thereof, located in a more rearward position than that of the concave 3, a contact-receiving protrusive streak 4 is provided in a longitudinal direction. Moreover, at each of four corners in the front of the mass body 1, a protrusion 4a is provided.

Three elastic leaves 8a, 8b, and 8b of the moving contact 5 are backwardly projected in parallel in an upward-direction of a concave 3 from each of the two sides, opposing each other, of a mounting plate 7 fitted on the boss 2 through its mounting hole 6. Of the elastic leaves 8a, 8b, and 8b, the elastic leaf 8a located at the center is placed above the contact-receiving protrusive streak 4, and is the longest among those. The rear end of the leaf is bent in a direction away from the contact-receiving protrusive streak 4. In contrast, the rear ends of a pair of the elastic leaves 8b, located on both sides, are bent such that the leaves approach the mass body 1.

The mass body 1 is formed of synthetic resins molded by an injection molding process. The specific gravity of the mass body 1 leaves room for adjustment to an arbitral value by adding a specific-gravity adjusting material to the synthetic resins. Accordingly, the sensitivity thereof can be adjusted by changing specific gravity of the mass body 1 while the volume of the body is kept constant.

To give the mass body 1 corrosion resistance in order to prevent slidableness from being deteriorated, it has only to add a raw material having corrosion resistance to the body. As a candidate for the material, it would be desirable to advantageously choose metal powder having excellent corrosion resistance such as rust-free tungsten even under high temperature and humidity conditions. More excellent corrosion resistance can be expected by upgrading purity of the metal powder. Since the addition of metal powder having corrosion resistance thereto gives the mass body 1 corrosion resistance, it eliminates the need for surface treatment of the mass body 1 by nickel-plating or the like for the purpose of giving corrosion resistance thereto, which pares down controlled process.

In order to more positively improve the sliding characteristic of the mass body 1, it has only to add materials that impart sliding characteristic to the body such as fluororesin, carbon, and potassium titanate thereto. With this, it eliminates the need for surface treatment with nickel-plating or the like for the purpose of enhancing the sliding characteristic thereof, thus whittling down controlled process.

The mass body 1 formed of synthetic resins facilitates the provision of the boss 2 thereon, as well as makes possible to deform the boss 2 projecting from the mounting hole 6 by means of thermal cauking or ultrasonic welding process and integrate the boss into the mass body 1 after the moving contact 5 is fitted around the boss 2 through the mounting hole 6. This abolishes the conventional sub-mass members for connecting the moving contact 5 to the mass body 1, which reduces the number of components.

In the inner surfaces 11 of the upper and lower or right and left sidewalls within the case 10 in which the mass body 1 is housed, a guiding surface 12a along which a side of the mass body 1 is slidably engagable and a guiding rail 12b on which the bottom of the mass body 1 slidably abuts is provided longitudinally. Moreover, in the inner surfaces 11 of the right and left or upper and lower sidewalls within the case 10, a stationary contact 14 is secured longitudinally, and further around the fringe of the front of the case 10, a seat 15 is provided, against which the protrusion 4a of the front of the mass body 1 is to be collided.

Between the front of the case 10 and that of the mass body 1, an elastic member 16 consisting of a coil spring is provided in compression, and the mass body 1 is backwardly (in the right direction in FIG. 3) urged by the elastic member 16. The rear of the case 10 is closed by a detachable cap 17. Moreover, on the case 10, lead terminals 18 each connected with the stationary contact 14 are projectingly provided from the case.

The operation of the detector will next be described.

Upon the vehicle collided against something and impact acceleration is impressed on the mass body 1, the mass body 1 slides forwardly (in the left direction in FIG. 3) against urging force of the elastic member 16. Then, the elastic leaves 8b located on both sides engage the stationary contact 14, and subsequently the elastic leaf 8a located at the center engages the contact. Thus, the moving contact 5 comes in contact with the stationary contact 14 to energize a circuit, thereby detecting that acceleration larger than a predetermined value is impressed thereon. At that time, the mass body 1 is permitted to slide to a maximum to a position where the protrusion 4a collides against the seat 15.

By virtue of the moving contact 5 provided with the sub elastic leaf 8a located at the center, the elastic leaf 8a can contribute to a contact for compensating an unstable contact even if the unstable contact occurs between the stationary contact 14 and the moving contact 5 by an impact generated when the mass body 1 collided against the case 10. Additionally, the elastic leaf 8a not only gives damping force to the mass body 1 near the end of the moving range of the mass body 1, but also absorbs an impact generated at the time of collision of the mass body 1 against the case 10. Further, when the elastic leaf 8a contacted the stationary contact 14, the elastic leaf contacts the contact-receiving protrusive streak 4, and restrictions are imposed on bending of the leaf with contact force of the leaf increasing to the stationary contact 14.

The acceleration detecting characteristic of the detector, i.e., the sensitivity thereof is determined by specific gravity of the mass body 1, a spring constant of the elastic member 16, frictional resistance between the moving contact 5 and the stationary contact 14 at the time they are engaged each other, and between the mass body 1 and the case 10. Moreover, regulating a clearance C between the mass body 1 and the guiding rail 12 conduces to ensure stable sliding of the mass body 1.

As mentioned above, through the arrangement according to the first embodiment in which the mass body is formed of synthetic resins, whose specific gravity is adjustable, molded by an injection molding process, the claimed invention gets the freedom of molding the mass body into an arbitrary shape. Therefore, the mass body is molded into an arbitrary shape such as make a portion of the mass body smaller than the other portion thereof, and the portion thereof can be bestowed upon connection with another component.

Further, through the arrangement according to the first embodiment in which specific gravity of the synthetic resins is changeable while keeping the volume of the mass body constant, the claimed invention allows easy adjustment of detection sensitivity of the detector.

Moreover, through the arrangement according to the first embodiment in which a specific gravity adjusting material contained in the mass body is composed of metal powder having corrosion resistance, the claimed invention enhances corrosion resistance of the mass body, and obtains steady sensitivity thereof.

Yet, through the arrangement according to the first embodiment in which the mass body is composed of a raw material to which a material liable for giving sliding characteristic are added, the claimed invention obviates the necessity for application of surface treatment for the purpose of improving the sliding characteristics thereof, thereby increasing its productivity and reducing a cost Still, through the arrangement according to the first embodiment in which a part of the mass body formed of thermoplastic synthetic resins is plasticized to thereby integrally securing the moving contact directly to the mass body, the claimed invention eliminates the necessity for dedicated members for securing the contact thereto, and reduces the number of components. This downsizes the mass body by simplifying its structure.

What is claimed is:
1. An acceleration detector comprising:
a mass body movably housed in a case;
an elastic member urging the mass body in one direction; and
a switch that opens and closes by movement of the mass body in another direction against urging force due to acceleration received by the mass body,
wherein the mass body is formed of synthetic resins, whose specific gravity is adjustable, molded by an injection molding process.

2. The acceleration detector according to claim 1, wherein the detector is arranged such that its detection sensitivity is adjustable by changing specific gravity of the synthetic resins while keeping the volume of the mass body constant.

3. The acceleration detector according to claim 1, wherein a specific gravity adjusting material contained in the mass body is composed of metal powder having corrosion resistance.

4. The acceleration detector according to claim 3, wherein the mass body is formed of a raw material to which a material is added which gives metal powder sliding characteristic.

5. The acceleration detector according to claim 1, wherein the switch is composed of a moving contact provided in the mass body and a stationary contact provided in the case, and wherein the mass body is formed of thermoplastic synthetic resins, and the moving contact is integrally secured to the mass body by plasticizing a part of the mass body.

6. The acceleration detector according to claim 5, wherein the acceleration detector comprises only one mass body which comprises a single mass member.

7. The acceleration detector according to claim 6, wherein the moving contact of the switch is fixedly attached to the single mass member.

8. The acceleration detector according to claim 5, wherein the moving contact comprises three fingers which contact the stationary contact.

9. The acceleration detector according to claim 8, further comprising a protrusion located on a side of the mass bodywhich maintains contact between the moving contact and the stationary contact and prevents at least one of the fingers from bending.

10. The acceleration detector according to claim 1, further comprising:
- a guiding surface provided in the case, wherein a side of the mass body is slidably engaged with the guiding surface; and
- a guiding rail provided in the case, wherein a bottom portion of the mass body slidably abuts the guiding rail.

* * * * *